July 10, 1934.  J. J. KAUFMANN  1,966,410
BAKING APPARATUS
Filed Dec. 30, 1931
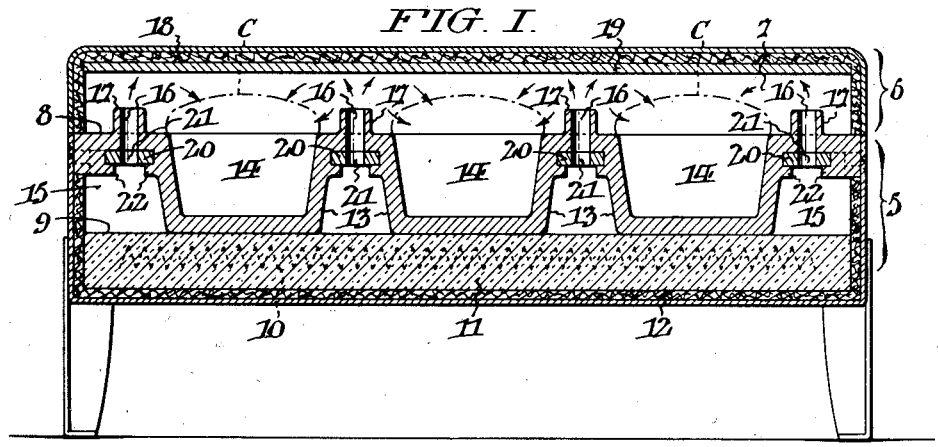
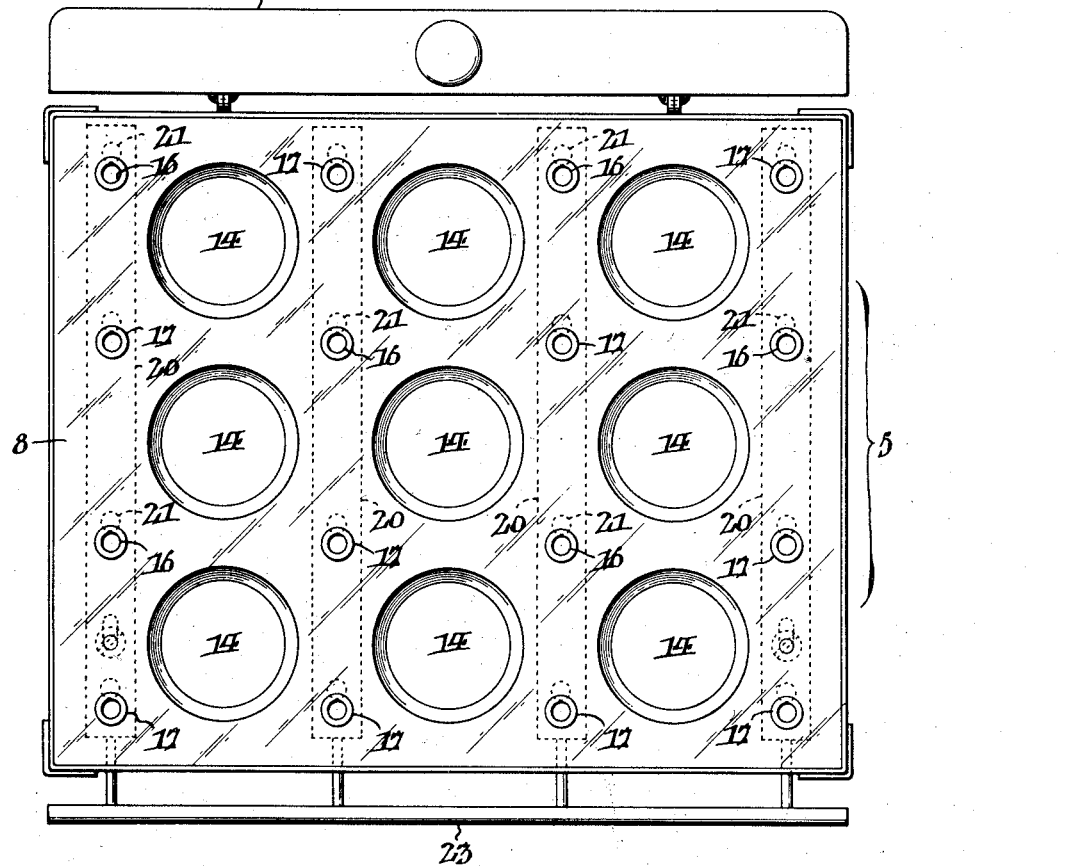
WITNESSES:  
John C. Bergner  
John A. Weidler
INVENTOR:  
James J. Kaufmann,  
BY Falley & Paul  
ATTORNEYS.

Patented July 10, 1934

1,966,410

UNITED STATES PATENT OFFICE 1,966,410

BAKING APPARATUS

James J. Kaufmann, Baltimore, Md., assignor to Doughnut Machine Corporation, New York, N. Y., a corporation of New York Application December 30, 1931, Serial No. 583,946

2 Claims. (Cl. 53—6)

This invention relates to electrically heated apparatus for baking cup cakes, muffins and the like.

In cake or muffin baking apparatus, as ordinarily constructed, two separate electric heating units are required, one for heating the mold which provides the cavities determining the shape of the articles being baked, and the other for heating the space or chamber within the cover over the mold. Accordingly, considerable current is consumed in the operation of such apparatus.

The aim of my invention is to render baking apparatus of the kind referred to more efficient from the standpoint of current consumption and at the same time insure that the cakes or muffins are thoroughly and uniformly cooked and browned. This desideratum I attain, as hereinafter fully set forth, by utilizing but a single heating unit beneath the mold and by providing for the flow of heated air from the coil upwardly through the mold and over and around the tops of the cakes or muffins exposed within the space or chamber afforded by the cover over the said mold.

My invention is further directed toward the provision of simple means whereby the flow of air heated as aforesaid may be regulated to determine the extent of browning of the tops of the cakes or muffins.

Still other objects and attendant advantages of my invention will be manifest from the detailed description following in connection with the attached drawing, wherein Fig. I is a longitudinal sectional view of a cake and muffin baking apparatus conveniently embodying the present improvements.

Fig. II is a plan view of the apparatus with the cover or lid in raised position.

As herein illustrated, the baking apparatus of my invention comprises a hollow rectangular base portion 5, and an upwardly-swingable hollow cover or lid 6 of like configuration which is hingedly connected along its rear edge. When down as shown in Fig. I, the lid 6 forms a closed chamber 7 over a mold plate 8 that extends across the top of the base portion 5 of the apparatus. Within the hollow of the base portion 5 beneath the mold plate 8 is an electric heating unit 9 which may be of a conventional type with coils 10 lodged in longitudinal slots of a slab 11 of insulation. To prevent loss of heat by radiation, I interpose a lining 12 of asbestos or the like between the heating unit 9 and the bottom and side walls of the base portion 5.

The mold plate 8, it will be noted, is formed with several transverse rows of depressions 13 defining circular open-top cavities 14 which determine the shape of the cakes or muffins C baked in the apparatus. As shown in Fig. I, the depressions 13 of the mold contact with the heating unit 9 so that the heat from the latter is transmitted directly to the baking cavities 14. As a consequence of the described arrangement, there is formed between the mold plate 8 and the heating unit 9, a horizontal interspace 15 which communicates with the chamber 7 under the lid 6 by way of openings 16 in the mold plate. These openings 16 are extended through projections 17 upstanding from the top of the mold plate 8 and thus brought to a level where they are immune against being fouled or becoming clogged by splash of dough or batter incident to filling of the mold cavities 14.

Incident to the operation of the apparatus, air heated by the heating unit 9 flows upward from within the horizontal interspace 15 through the openings 16 in the mold plate and into the chamber 7 where it circulates over and around the exposed tops of the cakes or muffins C.

In order to insure retention of heat in the chamber 7, I line the lid or cover 6 with thermo-insulation 18 which may be of asbestos like the lining of the base 5. The lid 6 I furthermore provide with a horizontal baffle plate 19 whereby the heated air, circulated as aforesaid, is deflected downwardly on to the cakes or biscuits C.

For the purpose of controlling the flow of the heated air from the interspace 15 to the chamber 7 I have fitted the apparatus with slides 20 having apertures 21 capable of being registered respectively with the flow openings 16 in the mold plate 8. As shown in Fig. I, these slides are confined to guideways 22 at the bottom of the mold plate 8, and connected, for simultaneous actuation, by a bar handle 23 which is conveniently accessible at the exterior of the apparatus.

In the use of the apparatus, the cavities 14 of the mold plate 8 are charged with batter or dough, the lid 6 closed and the slides 20 pushed inward so that the heat from the unit 9 is initially confined entirely to the mold 8. After the expiration of an interval requisite to insure proper heating of the mold 8, the slides 20 are drawn outward to effect registry between their apertures 21 and the openings 16 in said mold with attendant establishment of communication between the horizontal interspace 15 and the chamber 7. The chamber 7 soon becomes hot as a consequence of the flow thereinto of the heated air in the manner already understood, whereupon the cooking is permitted to proceed until the cakes or muffins C are thoroughly baked and browned. By proper regulation of the slides 20, it is obviously possible to predetermine any desired shade of browning of the articles being baked.

Having thus described my invention, I claim:

1. In baking apparatus of the character described, a hollow base portion, a mold in and extending across the top of the base portion with a series of cavities to determine the shape of the individual articles being baked, an electric heater unit for heating the mold from beneath by direct contact with the cavities, a closed chamber above the mold formed in an upwardly-swingable hinged hollow cover, said chamber being heated by flow of air from the heater unit upward through openings in the mold in the intervals between the cavities of said mold, slides with apertures capable of being registered with the openings in the mold, and means whereby said slides may be simultaneously adjusted to control upward flow of the air.

2. In baking apparatus of the character described, a hollow rectangular base portion, a mold in and extending across the top of the base portion with a series of cavities to determine the shape of the individual articles being baked, an electric heater unit for heating the mold from beneath by direct contact with the cavities, a closed chamber above the mold formed in an upwardly-swingable hinged hollow cover, said chamber being heated by flow of air from the heater unit by way of openings extending upwardly through projections upstanding from the top of the mold in the intervals between the cavities therein, a baffle plate within the hollow cover to deflect the heated air downwardly over the top of the articles being baked, slides with apertures capable of being registered with the openings in the mold, and means whereby said slides may be simultaneously adjusted to control upward flow of the air.

JAMES J. KAUFMANN.